(12) United States Patent
Zimmermann

(10) Patent No.: US 11,339,863 B2
(45) Date of Patent: May 24, 2022

(54) FLEXIBLE GEAR WHEEL AND GEAR MECHANISM WITH SUCH A FLEXIBLE GEAR WHEEL

(71) Applicant: Maxon International AG, Sachseln (CH)

(72) Inventor: Dirk Zimmermann, Sexau (DE)

(73) Assignee: MAXON INTERNATIONAL AG, Sachseln (CH)

( * ) Notice: Subject to any disclaimer, the term of this patent is extended or adjusted under 35 U.S.C. 154(b) by 0 days.

(21) Appl. No.: 17/104,907

(22) Filed: Nov. 25, 2020

(65) Prior Publication Data

US 2021/0156460 A1 May 27, 2021

(30) Foreign Application Priority Data

Nov. 26, 2019 (EP) ..................................... 19211553

(51) Int. Cl.
*F16H 49/00* (2006.01)
*F16H 1/32* (2006.01)

(52) U.S. Cl.
CPC ............ *F16H 49/001* (2013.01); *F16H 1/32* (2013.01); *F16H 2001/327* (2013.01); *F16H 2049/003* (2013.01)

(58) Field of Classification Search
CPC .... F16H 49/001; F16H 1/32; F16H 2001/327; F16H 2049/003; F16H 55/0833; F16H 55/17
See application file for complete search history.

(56) References Cited

U.S. PATENT DOCUMENTS 2,966,808 A * 1/1961 Grudin .................. F16H 49/001
74/640
6,805,025 B2 * 10/2004 Ruttor ..................... F16H 25/06
475/161

(Continued)

FOREIGN PATENT DOCUMENTS

| CN | 1471117 A * | 1/2004 | ........... H01H 3/3005 |
| DE | 102016116438.0 B3 | 1/2018 | |
| EP | 3779239 A1 * | 2/2021 | ........... F16H 49/001 |

(Continued)

OTHER PUBLICATIONS

European Search Report issued in corresponding European Patent Application No. EP19211553.3, 7 pages (dated Mar. 24, 2020).

*Primary Examiner* — Sherry L Estremsky
(74) *Attorney, Agent, or Firm* — Buchanan Ingersoll & Rooney PC

(57) ABSTRACT

A gear mechanism is disclosed with a ring gear, with a flexible gear wheel arranged in the ring gear and with a wave generator which is in contact with the flexible gear wheel and which deforms the flexible gear wheel so that it is in sections in engagement in the ring gear. The gear mechanism can be configured in such a way that interference in the engagement in the gear teeth and the gear backlash are reduced, the noise behavior and the power transmission are improved and the service life is increased. The flexible gear wheel can include at least two flexible gear wheel disks arranged adjacent to one another in the axial direction, and each gear wheel disk can include at least two toothed segments in the circumferential direction which are connected to one another by way of spring segments.

20 Claims, 4 Drawing Sheets

(56) References Cited

Figure 1:
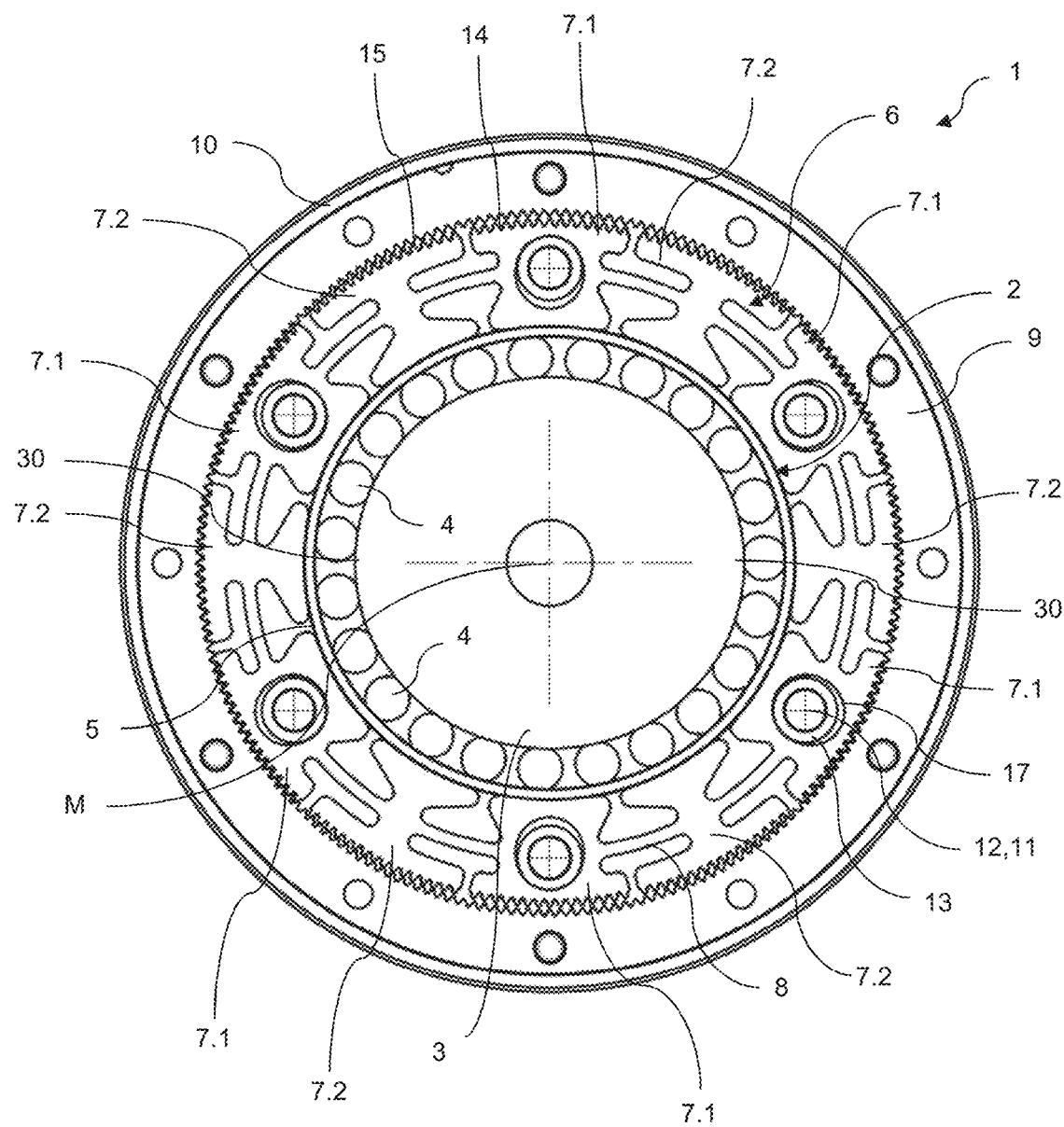

U.S. PATENT DOCUMENTS 8,656,809 B2 * 2/2014 Bayer .................. F16H 25/06
74/640
2009/0205451 A1 8/2009 Bayer et al.

FOREIGN PATENT DOCUMENTS

| WO | WO-9412812 A1 * | 6/1994 | ............ F16H 25/06 |
| WO | WO-9914012 A1 * | 3/1999 | ............ B23P 15/00 |
| WO | 2008028540 A1 | 3/2008 | |
| WO | 2016165684 A2 | 10/2016 | |
| WO | 2016165684 A3 | 12/2016 | |
| WO | WO-2017022062 A1 * | 2/2017 | ........... F16H 49/001 |

\* cited by examiner

FLEXIBLE GEAR WHEEL AND GEAR MECHANISM WITH SUCH A FLEXIBLE GEAR WHEEL

The present invention relates to a gear mechanism with a ring gear, with a flexible gear wheel arranged in the ring gear and with a wave generator which is in contact with the flexible gear wheel and which deforms the flexible gear wheel so that it is in sections in engagement in the ring gear.

Such gear mechanisms are already known and are used, for example, in robotics. Use in the automotive sector is also known. For example, WO 2016/165684 A2 shows an adjustment mechanism for adjusting two components with a ring gear, a driver wheel, a wave generator and an elastic spur wheel. The elastic spur wheel consists of several identically structured tooth elements Each tooth element comprises a head region facing the ring gear and a foot region facing the wave generator. The head regions of the tooth elements are provided with gear teeth that can come into contact with the ring gear. In addition, each tooth element has an outwardly open recess in its head segment which interrupts the gear teeth and is in contact with a driver pin of a driver wheel. Tooth elements located adjacent to one another are connected to one another by way of elastic connection elements. The wave generator is substantially elliptical and also makes the elastic spur gear assume an elliptical shape so that two oppositely disposed regions of the elastic spur wheel are in engagement in the ring gear.

In such a gear mechanism, the central flexible gear wheel can tilt toward the ring gear axis due to bearing issues so that not the entire gear wheel width comes into engagement for torque transmission, but only a certain portion of the entire gear wheel width. Furthermore, flank direction errors can arise due to manufacturing tolerances, which also lead to the fact that also only a portion of the entire gear wheel width is used. Circular runout tolerances and other manufacturing tolerances can therefore lead to interference in engagement due to geometrical deviations.

Proceeding from this prior art, an above-described gear mechanism or a flexible gear wheel for the gear mechanism, respectively, is now to be further improved so that interference in engagement in the gear teeth and the gear backlash are reduced, the noise development behavior and the power transmission are improved, and the service life is increased.

For this purpose, it is provided according to the invention that the flexible gear wheel comprise at least two flexible gear wheel disks arranged adjacent to one another in the axial direction and each gear wheel disk comprises at least two toothed segments in the circumferential direction which are connected to one another by way of spring segments.

In the present context, the axial direction means a direction along the ring gear axis. This corresponds substantially to the direction of a center axis of the gear mechanism. As a result of this segmentation of the flexible gear wheel in the axial direction into individual flexible gear wheel disks, the tooth width of an individual flexible gear wheel disk corresponds to a maximum of half the total gear teeth width. Tilting of the individual gear wheel disks relative to the ring gear axis or to a center axis of the gear mechanism, respectively, can be compensated for by the other flexible gear wheel disks. This increases the engagement of the flexible gear wheel over the entire gear teeth width and therefore significantly reduces the probability of only partial gear wheel overlap or of edge support. The radial individual flexibility of the individual flexible gear wheel disks enables flexible engagement. The individual flexible gear wheel disks can therefore be slightly rotated relative to one another in the circumferential direction, whereby the tooth backlash can be reduced to up to 0°. The power transmission, the noise development, and the gear backlash are thus improved.

It can be provided in an advantageous embodiment that the flexible gear wheel disks located adjacent to one another in the axial direction have the same number of teeth and the same tooth geometry. A wider flexible gear wheel is therefore formed by the flexible gear wheel disks located adjacent to one another in the axial direction. Since the gear teeth of the flexible gear wheel are composed of individual regions that can move relative to one another in the axial direction, namely the gear teeth of the individual flexible gear wheel disks, interference in the engagement of the individual flexible gear wheel disks can be compensated for by the other flexible gear wheel disks, so that a reduction in the interference in the engagement of the entire flexible gear wheel is achieved overall which also leads to a reduced gear backlash and therefore to improved noise development behavior and a longer service life.

It can also preferably be provided that the flexible gear wheel disks located adjacent to one another in the axial direction bear against one another. This also leads to the fact that the flexible gear wheel disks form an overall gear wheel with a greater width and the advantages associated therewith.

A particularly simple configuration and a uniform structure of the flexible gear wheel can be obtained in that the flexible gear wheel disks located adjacent to one another in the axial direction have the same gear teeth width in the axial direction.

It can be provided in yet another advantageous embodiment that the flexible gear wheel comprises more than two, preferably four flexible gear wheel disks located adjacent to one another in the axial direction. It has been shown that with a number of four flexible gear wheel disks located adjacent to one another in the axial direction, the probability of only partial gear wheel overlap or the occurrence of edge support is very low, which leads to the advantages specified above.

In a particularly advantageous embodiment, the flexible gear wheel disks are formed as identical parts. The flexible gear wheel is therefore formed by four identically configured individual gear wheels, the flexible gear wheel disks, which are arranged adjacent to one another in the axial direction. Since the flexible gear wheel disks are configured as identical parts, production is simplified and cost are saved.

It can be provided in yet another embodiment that at least one of the toothed segments of each flexible gear wheel disk comprises a recess, where the flexible gear wheel disks are arranged in such a way that the recesses are located one above the other and a pin element is disposed in the recesses located one above the other, and each of the spring segments of the flexible gear wheels have a center plane which contains a center axis of the gear mechanism and divides the respective spring segment into two regions of equal length and each recess has a center plane which contains the center axis of the gear mechanism and divides the recess into two equally large regions, and the center plane of each spring segment has a different distance from the center plane of the recess located adjacent thereto on each side of the center plane of the spring segment. This allows the flexibility of the flexible gear wheel disks and therefore of the entire flexible gear wheel to be increased so that sufficient elastic deformations of the flexible gear wheel disks or of the flexible gear wheel, respectively, can still be realized, in particular with small diameters of the gear mechanism. Since the recesses in the individual flexible gear wheel disks are located one above the other and are therefore congruent, the pin elements can be easily inserted and extend through all flexible gear wheel disks and therefore through the entire flexible gear wheel.

It can also be provided that at least one of the toothed segments of each flexible gear wheel disk has a waisting in the radial direction of the flexible gear wheel and that the spring segments engage in this toothed segment in the region of the waisting. As a result, the spring segments can be configured to be longer, whereby the flexibility of the flexible gear wheel disks is further increased, which is particularly advantageous with small diameters.

The spring segments should be configured in such a way that they exhibit elasticity in the radial direction and are rigid in the tangential direction. Deformation of the flexible gear wheel disks is then permitted only in the radial direction. In the tangential direction, forces can be transmitted from one toothed segment to the adjacent toothed segment without deformation of the flexible gear wheel disks. As a result, gear backlash between the gear mechanism input and the gear mechanism output is kept as small as possible. This can be made possible in a particularly simple manner in that the spring segments are designed as webs which connect adjacent toothed segments to one another. The spring segments are then advantageously formed integrally with the toothed segments.

In order to further increase the flexibility of the flexible gear wheel disks and therefore also of the entire flexible gear wheel, it can be provided that each flexible gear wheel disk comprises at least one first toothed segment that is provided with a recess and at least one second toothed segment that comprises no recess. As a result, the spring segments extending between the toothed segments can be configured to be longer and a good combination of flexibility and strength of the toothed segments is obtained. The gear teeth force of the at least one second toothed segment, i.e. of the toothed segment without a recess, is transmitted to the at least one first toothed segment via the spring segments. The toothed segments provided with a waisting are preferably the second toothed segments and do not comprise a recess.

In yet another embodiment, the spring segments engage in the at least one first toothed segment at the level of the recesses in the at least one first toothed segment. This results in a good transmission of the gear teeth forces of the at least one second toothed segment to the at least one first toothed segment. The flexibility of the flexible gear wheel disks and therefore of the entire flexible gear wheel can be further increased if the spring segments comprise a relief cut in the region in which they are in contact with the at least one first toothed segment.

Furthermore, it can be provided that each flexible gear wheel disk comprises a plurality of toothed segments, in particular at least four toothed segments. Each flexible gear wheel disk then preferably has an even number of toothed segments, where half of the toothed segments, the first toothed segments, comprise a recess and the other half of the toothed segments, the second toothed segments, are configured without a recess. This enables a good compromise between the flexibility of the flexible gear wheel disks and therefore of the flexible gear wheel as well as sufficient strength.

It is provided in a particularly advantageous embodiment that the recess in the first toothed segments is arranged in the interior of the respective toothed segment and has a closed contour. The pin element arranged in the recesses therefore rolls along the closed circumferential contour, as a result of which the contact between the pin element and the recess in the corresponding toothed segments is never interrupted. This increases the running smoothness of the gear mechanism. The recesses are advantageously configured to be substantially elliptical. Furthermore, the toothed segments can then have end-to-end gear teeth in a head region facing the ring gear.

According to yet another embodiment, each of the toothed segments of the flexible gear wheel disks can be supported at two support points on the wave generator. A foot region of the toothed segments facing the wave generator is then formed to be concave so that it only comes into contact with the wave generator at two support points. The region of the toothed segments formed between the two support points is curved away from the wave generator due to the concave shape of the foot region of the toothed segments, so that there is no contact there between the toothed segments and the wave generator. The angle between the two support points is preferably approximately 170°. The alignment of the toothed segments normal to the outer contour of the wave generator can thus be improved.

It is provided in yet another embodiment that the wave generator comprises at least one cam which is in contact with the flexible gear wheel, and the cam is configured such that the toothed segments are deformed in the region in which they are in engagement in the ring gear such that they form a section of an imaginary gear wheel having a constant radius and rotating about an axis that is at a fixed distance from the center axis of the gear mechanism.

It can be provided in a simple embodiment that the pin elements are configured as bolts that are connected to an output shaft. As a result, the motion of the flexible gear wheel is transferred via the bolts to a uniform rotary motion of the output. A sleeve is preferably arranged on each bolt so that a sliding bearing with the associated advantages is formed. Alternatively, an elastic sleeve or elastic O-rings can also be arranged on each bolt. In this configuration variant, the associated recesses can alternatively be configured having a round cross section. In an alternative configuration, the pin elements are formed to be stationary and the ring gear to be rotatable. The ring gear is there driven by the engagement of the flexible gear wheel and accordingly serves as an output element in this variant.

In a further preferred embodiment, the flexible gear wheel disks of the flexible gear wheel are made from metal or metallic glass. Furthermore, the ring gear in engagement in the flexible gear wheel is also preferably made of metal or of metallic glass.

In a preferred embodiment, a flexible gear wheel disk has a thickness of approx. 1.5 mm so that a flexible gear wheel with, for example, two flexible gear wheel disks located adjacent to one another in the axial direction has a thickness of approx. 3 mm and a flexible gear wheel with, for example, four gear wheel disks located adjacent to one another in the axial direction has a thickness of approx. 6 mm.

In a further preferred embodiment, a flexible gear wheel disk has a thickness of approx. 3 mm so that a flexible gear wheel with, for example, two flexible gear wheel disks located adjacent to one another in the axial direction has a thickness of approx. 6 mm and a flexible gear wheel with, for example, four gear wheel disks located adjacent to one another in the axial direction has a thickness of approx. 12 mm.

Furthermore, the present invention also relates to a flexible gear wheel for a gear mechanism described above, where the flexible gear wheel comprises at least two, preferably four, flexible gear wheel disks located adjacent to one another in the axial direction, and where each gear wheel disk comprises at least two toothed segments in the circumferential direction that are connected to one another by way of spring segments.

The flexible gear wheel therefore comprises several individual gear wheels located adjacent to one another in the axial direction, the flexible gear wheel disks. As a result of this segmentation of the flexible gear wheel in the axial direction into individual flexible gear wheel disks, the tooth width of one individual flexible gear wheel disk corresponds to a maximum of half the total gear teeth width. Tilting of the individual gear wheel disks, and therefore the gear teeth region of the individual gear wheel disks relative to the ring gear axis or to a center axis of the gear mechanism, respectively, can be compensated for by the other flexible gear wheel disks. This increases the engagement of the flexible gear wheel over the entire width of the flexible gear wheel and therefore significantly reduces the probability of only a partial gear wheel overlap or of edge support. The individual radial flexibility of the individual flexible gear wheel disks enables flexible engagement. The individual flexible gear wheel disks can therefore be slightly rotated relative to one another in the circumferential direction, whereby the gear backlash can be reduced to up to 0°. The power transmission, the noise development, and the backlash are thus improved.

It can be provided in an advantageous embodiment of the flexible gear wheel that at least one of the toothed segments of each flexible gear wheel disk comprises a recess for receiving a pin element, where the flexible gear wheel disks are arranged such that the recesses lie one above the other and where each of the spring segments has a center plane which includes a center axis of the flexible gear wheel and divides the respective spring segment into two regions of equal length and each recess has a center plane which includes the center axis of the flexible gear wheel and divides the recess into two equally large regions and the center plane of each spring segment has a different distance to the center plane of the recess located adjacent to each side of the center plane of the spring segment. Since the recesses in the individual flexible gear wheel disks are located one above the other and are therefore congruent, the pin elements can be easily inserted and extend through all flexible gear wheel disks and therefore through the entire flexible gear wheel. This allows the flexibility of the flexible gear wheel to be increased so that sufficient elastic deformations of the gear wheel can still be obtained, in particular with small diameters of the gear mechanism.

In a further preferred embodiment of the flexible gear wheel, the flexible gear wheel disks are made of metal or of metallic glass.

In a preferred embodiment of the flexible gear wheel, a flexible gear wheel disk has a thickness of approx. 1.5 mm so that a flexible gear wheel with, for example, two flexible gear wheel disks located adjacent to one another in the axial direction has a thickness of approx. 3 mm and a flexible gear wheel with, for example, four gear wheel disks located adjacent to one another in the axial direction has a thickness of approx. 6 mm.

In a further preferred embodiment of the flexible gear wheel, a flexible gear wheel disk has a thickness of approx. 3 mm so that a flexible gear wheel with, for example, two flexible gear wheel disks located adjacent to one another in the axial direction has a thickness of approx. 6 mm and a flexible gear wheel with, for example, four gear wheel disks located adjacent to one another in the axial direction has a thickness of approx. 12 mm.

Figure 2:
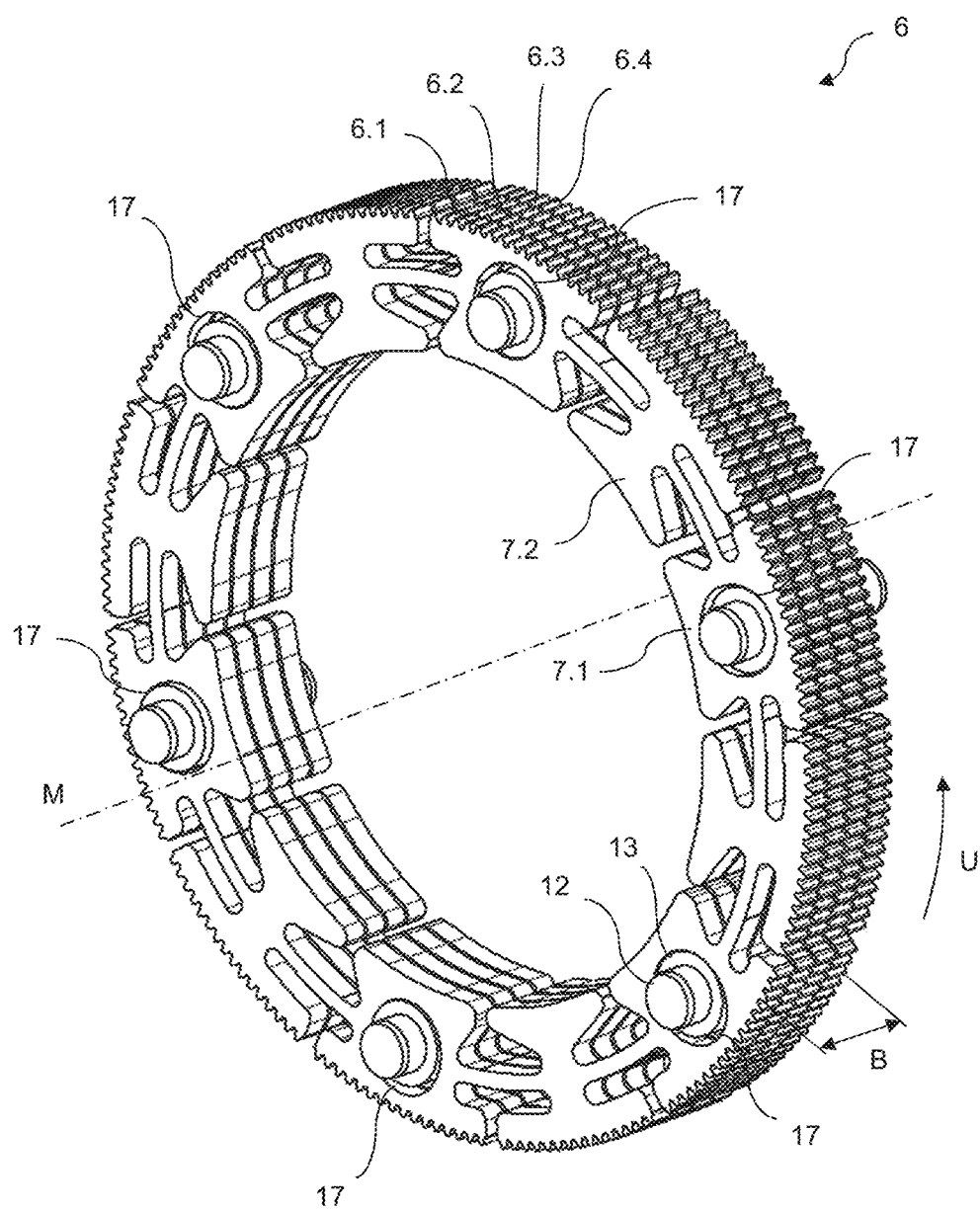
Figure 3:
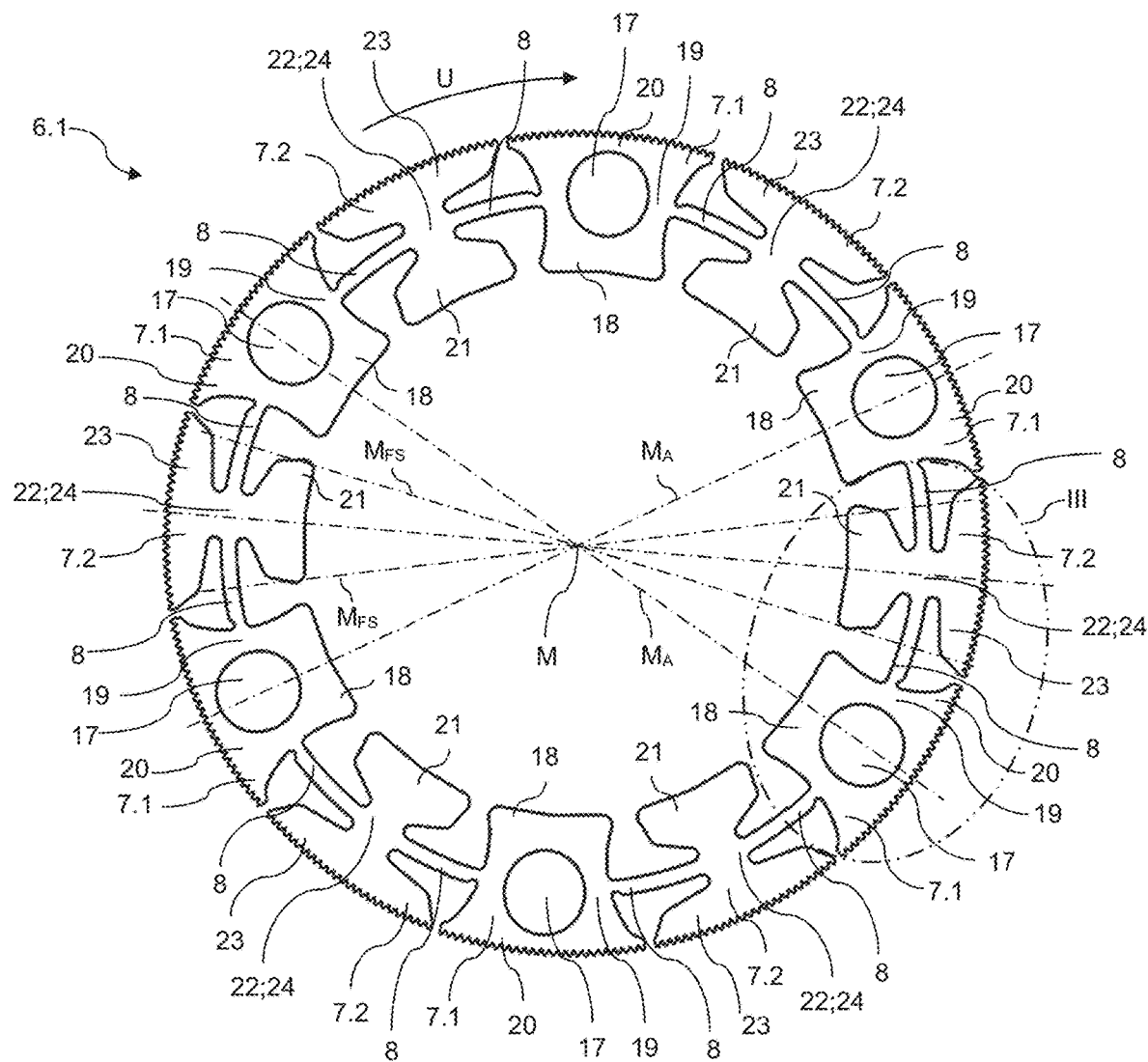
Figure 4:
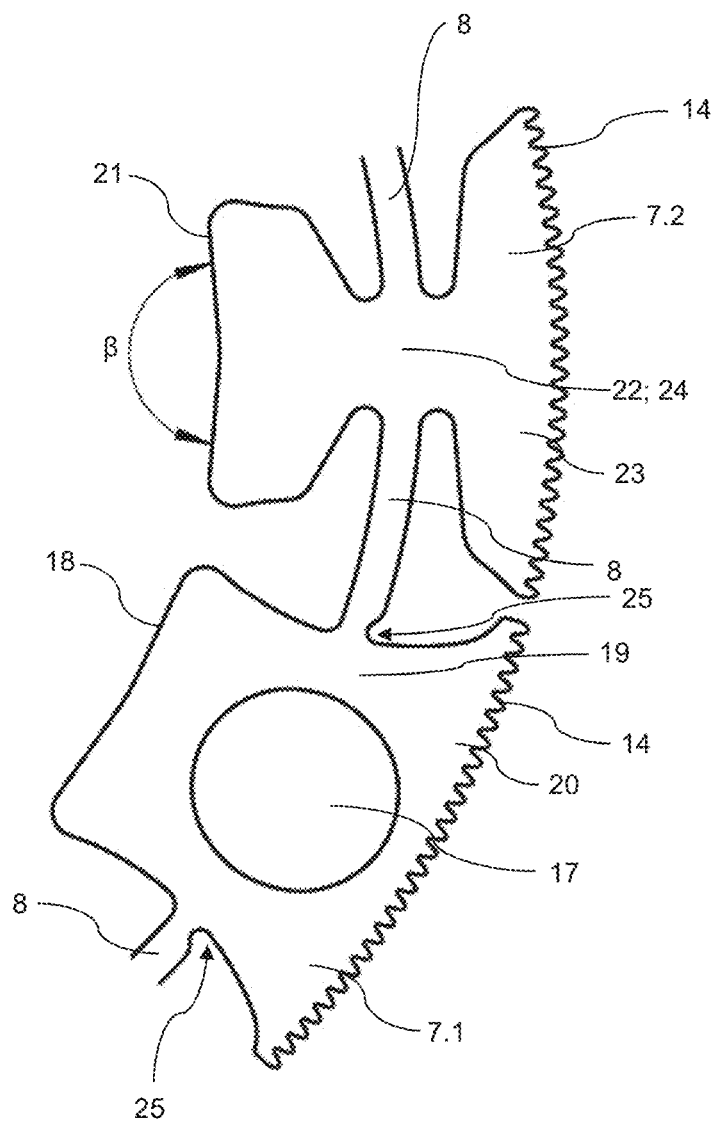

The invention shall be described below in more detail using the figures, where:

FIG. 1: shows gear mechanisms according to the invention,

FIG. 2: shows a flexible gear wheel of the gear mechanism from FIG. 1,

FIG. 3: shows a front view of a flexible gear wheel disk of the flexible gear wheel from FIG. 2, FIG. 4: shows a detail of the flexible gear wheel disk from FIG. 3.

It applies to the following explanations that like components are designated with like reference numerals. Where a figure contains reference numerals which are not explained in more detail in the associated figure description, then reference is made to preceding or subsequent figure descriptions.

An embodiment of a gear mechanism 1 of the present invention is shown in FIG. 1. Gear mechanism 1 comprises a housing 10 in which a wave generator 2, a flexible gear wheel 6, and a stationary ring gear 9 are arranged. The cover of housing 10 has been removed in order to provide a view into the interior of the gear mechanism. Gear mechanism 1 is substantially disk-shaped with a center axis M. Center axis M corresponds to the axis of ring gear 9.

Wave generator 2 comprises a base body 3 which has an approximately elliptical cross-section. Due to the approximately elliptical cross-section, two cams 30 are formed on base body 3 and therefore on wave generator 2. Rolling elements 4, which are surrounded by a deformable sleeve 5, are arranged on base body 3. Wave generator 2 is arranged in flexible gear wheel 6. Flexible gear wheel 6 is therefore in contact with base body 3 via deformable sleeve 5 and rolling elements 4. The elliptical shape of base body 3 of wave generator 2 is transferred to flexible gear wheel 6 via rolling elements 4 and deformable sleeve 5, so that flexible gear wheel 6 is elliptically deformed and thereby brought into contact with ring gear 9 in two regions of engagement.

Flexible gear wheel 6 comprises several toothed segments 7.1, 7.2 which are connected to one another by way of flexible spring segments 8. Flexible gear wheel 6 is provided with external gear teeth 14 and the stationary ring gear 9 comprises internal gear teeth 15. Due to the elliptical deformation of flexible gear wheel 6 caused by wave generator 3, external gear teeth 14 of flexible gear wheel 6 are in engagement in internal gear teeth 15 of ring gear 9 in two oppositely disposed regions, the engagement regions.

In the embodiment illustrated, flexible gear wheel 6 comprises twelve toothed segments 7.1, 7.2 which are divided into six first toothed segments 7.1 and six second toothed segments 7.2. First toothed segments 7.1 each comprise a recess 17 which is configured as an end-to-end opening in the interior of respective first toothed segment 7.1. A respective bolt 12 of pin element 11 is received in each recess 17. Each bolt 12 is surrounded by a sleeve 13 so that a sliding bearing is formed. Bolts 12 are connected to an output shaft. Recesses 17 are somewhat larger than sleeves 13. As a result, bolts 12 can roll along recesses 17. In the case shown, recesses 17 have an elliptical cross-section. The cross-section of bolts 12 and sleeves 13 is round. The diameter of recesses 17 is slightly larger than the outer diameter of sleeves 13.

Wave generator 2 is preferably connected to a drive shaft. A rotation of the drive shaft causes wave generator 2 to rotate. This rotary motion is transmitted to flexible gear wheel 6. External gear teeth 14 of flexible gear wheel 6 therefore runs along internal gear teeth 15 of ring gear 9. Spring segments 8 arranged between toothed segments 7.1, 7.2 enable the flexible or elastic deformation of flexible gear wheel 6. The motion of flexible gear wheel 6 is transferred via bolts 12 to a uniform rotary motion of the output. However, it could also be provided that the bolts are connected to the housing and are therefore rigid. In this case the ring gear serves as an output.

FIG. 2 shows flexible gear wheel 6 from FIG. 1 in a perspective representation. Flexible gear wheel 6 is configured to be formed segmented in the axial direction, i.e. in the direction of center axis M. This means that flexible gear wheel 6 is divided into several flexible gear wheel disks which are arranged adjacent to one another in the axial direction. In the embodiment illustrated, flexible gear wheel 6 comprises four flexible gear wheel disks 6.1, 6.2, 6.3, 6.4. However, it can also be provided that the flexible gear wheel comprises more or fewer flexible gear wheel disks. The flexible gear wheel disks 6.1 to 6.4 are configured as identical parts and are therefore identical to one another. The flexible gear wheel disks are preferably made from metal or metallic glass. The structure of the flexible gear wheel disks shall be described in more detail below with reference to FIG. 3.

FIG. 3 shows a front view of a single flexible gear wheel disk 6.1. The other flexible gear wheel disks 6.2 to 6.4 are formed to be identical. The following description therefore applies to all flexible gear wheel disks 6.1 to 6.4

Flexible gear wheel disk 6.1 is formed as an individual gear wheel and comprises first toothed segments 7.1 and second toothed segments 7.2. First toothed segments 7.1 and second toothed segments 7.2 are arranged alternately and each connected to one another by way of respective spring segments 8. In the embodiment illustrated, flexible gear wheel disk 6.1 comprises twelve toothed segments 7.1, 7.2. Every second of the toothed segments, i.e. the first toothed segments 7.1, comprises a recess 17. In the case shown, recesses 17 are elliptical. However, the recesses can also be circular. First toothed segments 7.1 are all configured to be identical to one another. Second toothed segments 7.2 are arranged between first toothed segments 7.1. Second toothed segments 7.2 comprise no recess. Adjacent toothed segments 7.1, 7.2 are connected to one another by way of spring segments 8. Spring segments 8 are configured as arcuate webs which extend along a circular line, the center of which in this configuration is disposed on center axis M of gear mechanism 1.

The shape of first toothed segments 7.1 and second toothed segments 7.2 shall be described in more detail below:

Each first toothed segment 7.1 comprises a foot region 18 with which it comes into contact with wave generator 2. Starting out from foot region 18, a trunk region 19 adjoins radially outwardly in which recess 17 is formed. Recess 17 therefore has a closed contour located in the interior of toothed segment 7.1. Bolt 12 or sleeve 13, respectively, rolls along this contour. As a result, the contact of bolt 12 or sleeve 13 with recess 17 is never interrupted, whereby the running smoothness of gear mechanism 1 is increased. A head region 20 adjoins trunk region 19 in the radial direction. External gear teeth 14 are formed on the outwardly facing circumferential surface of head region 20 of each first toothed segment 7.1. Since recess 17 is arranged in the interior of first toothed segment 7.1, external gear teeth 14 extend over the entire outwardly facing circumferential surface of first toothed segment 7.1. If the width of first toothed segment 7.1 in the circumferential direction U of flexible gear wheel disk 6.1 is now examined, then first toothed segment 7.1 has a first width in foot region 18 that tapers in the trunk region and increases again towards the outside so that first toothed segment 7.1 has the greatest width at the outer circumference.

Second toothed segments 7.2 also comprise a foot region 21 which comes into contact with wave generator 2. A trunk region 22, which transitions to a head region 23, adjoins this foot region 21 in the radial direction outwardly also in the case of second toothed segments 7.2. Second toothed segments 7.2 comprise no recess. Instead, second toothed segments 7.2 are strongly constricted in trunk region 22 and therefore have a waisting 24. External gear teeth 14 are also formed on the outwardly facing circumferential surface of head regions 23 of second toothed segments 7.2.

Each of toothed segments 7.1, 7.2 is connected to adjacent toothed segments 7.2, 7.1 by way of spring segments 8. Spring segments 8 are configured as arcuate webs which extend on a circular line in the circumferential direction of flexible gear wheel disk 6.1. Spring segments 8 engage in first toothed segments 7.1 approximately at the level of the center of recess 17. The connection between spring segments 8 and second toothed segments 7.2 is at the level of waisting 24. As can be clearly seen in FIG. 3, flexible gear wheel disk 6.1 is formed integrally.

Second toothed segments 7.2, which do not comprise a recess, transmit the gear teeth forces via spring elements 8 to first toothed segments 7.1 with recess 17. This allows spring segments 8 to be configured to be larger, whereby the flexibility is increased and sufficient elastic deformation can still be obtained with a smaller diameter of gear mechanism 1. The shape of spring elements 8 illustrated ensures that they have no elasticity in the tangential direction to the extent possible, but only in the radial direction.

Each of spring segments 8 has a center plane $M_{FS}$ which contains center axis M of gear mechanism 1 and divides respective spring segment 8 into two regions of equal length. Since spring segments 8 are formed by webs in the shape of a circular arc, this length corresponds to an arc length. Each of recesses 17 also has a center plane $M_A$ which contains the center axis of gear mechanism 1 and divides respective recess 17 into two equally large regions. Spring segments 8 between toothed segments 7.1, 7.2 are configured asymmetrically in such a way that center plane $M_{FS}$ of each spring segment 8 is at a different distance from the two center planes $M_A$ of recesses 17 adjacent thereto. Center plane $M_{FS}$ of each spring segment 8 and center plane $M_A$ of each recess 17 intersect at the center axis M of gear mechanism 1. The distance between center plane $M_{FS}$ of each spring segment and the two center planes $M_A$ each respectively disposed adjacent thereto can therefore be expressed by angles that are different in size.

Detail III from FIG. 3 is shown enlarged in FIG. 4. A first toothed segment 7.1 and a second toothed segment 7.2 are shown. As already described, first toothed segment 7.1 comprises a foot region 18, a trunk region 19, and a head region 20. Recess 17 is located in trunk region 19 of first toothed segment 7.1. External gear teeth 14 are formed in head region 20. Second toothed segment 7.2 also comprises a foot region 21, a trunk region 22 which has a waisting 24, and a head region 23. External gear teeth 14 are formed on the outer circumferential surface of head region 23. Both foot region 21 of second toothed segment 7.2 as well as foot region 18 of first toothed segment 7.1 comprise a concave depression so that each of toothed segments 7.1, 7.2 is supported on wave generator 2 with two points of support. The alignment of the toothed segments 7.1, 7.2 normal to the outer contour of wave generator 2 is thus improved. This concave depression has an opening angle β of approximately 170°.

Spring segments 8 engage in first toothed segments 7.1 approximately at the level of recesses 17. Spring segments 8 have a relief cut 25 in the region where spring segments 8 transition to first toothed segments 7.1. This relief cut 25 can increase the flexibility of flexible gear wheel 6 in the transition region from spring segments 8 to first toothed segments 7.1.

Spring segments 8 engage in second toothed segments 7.2 at the level of waisting 24. Since second toothed segments 7.2 have a very small width in this region, there is sufficient flexibility given there. Adjacently disposed toothed segments 7.1, 7.2 are arranged at a distance from one another both in the head region as well as in the foot region.

As can be seen in FIG. 4, first toothed segments 7.1 can have a different number of teeth than second toothed segments 7.2. The number of teeth of flexible gear wheel 6 is therefore no integral multiple of the number of toothed segments 7.1, 7.2. The number of toothed segments 7.1, 7.2 is therefore not determined by the number of teeth of entire flexible gear wheel 6. The number and/or the arrangement of the teeth on toothed segments 7.1, 7.2 is therefore not necessarily uniform. In order for every tooth on toothed segments 7.1, 7.2 to have the same shape, the geometry of wave generator 2, i.e. the elliptical cross-sectional shape with two oppositely disposed cams, can be selected such that a constant radius extends in the region of the upper high point (elevation) over the angle within which the tooth engagement takes place. All toothed segments 7.1, 7.2 located within this section, i.e. this angle, result in an imaginary gear wheel with the constant radius and rotating about an axis. This axis is at a certain distance from center axis M of gear mechanism 1. The distance there has a length ratio of less than 10% to the radius of the ring gear. The only boundary condition is that the distance between the two outer teeth, which are located on adjacent gear mechanism elements 7.1, 7.2, be an integral multiple of the tooth width within this region. The tooth width is presently defined as twice the distance between two adjacent teeth of external gear teeth 14.

In the following, the structure of flexible gear wheel 6 shall be described again in more detail with reference to FIG. 2. The flexible gear wheel comprises four flexible gear wheel disks 6.1, 6.2, 6.3, 6.4. The four flexible gear wheels disks 6.1 to 6.4 are configured as individual gear wheels, as already described with reference to FIGS. 3 and 4. Flexible gear wheel disks 6.1 to 6.4 are arranged in the axial direction in such a way that their face sides bear against one another. Flexible gear wheel disks 6.1 to 6.4 are aligned in the circumferential direction in such a way that second gear wheel segments 7.2 of all flexible gear wheel disks 6.1 to 6.4 lie one above the other. First toothed segments 7.1 of all flexible gear wheel disks 6.1 to 6.4 therefore also lie one above the other. As a result, also recesses 17 of all flexible gear wheel disks 6.1 to 6.4 are substantially congruent, so that they extend in axial direction M through the entire width B of flexible gear wheel 6. Arranged in recesses 17 are sleeves 13 in which bolts 12 are received. Flexible gear wheel disks 6.1 to 6.4 are therefore supported, firstly, in ring gear teeth and, secondly, on bolt 12 or pin element 11, respectively. This enables torque transmission.

Flexible gear wheel disks 6.1 to 6.4 can each individually be tilted slightly perpendicular to center axis M. As a result, tilting of one of the flexible gear wheel disks relative to center axis M or the ring gear axis, respectively, for example due to bearing issues, can be compensated for by the other flexible gear wheel disks. Flank direction errors of the individual flexible gear wheel disks which are caused, for example, by manufacturing tolerances, can also be compensated for by the other flexible gear wheel disks.

Since flexible gear wheel disks 6.1 to 6.4 can each also be slightly offset from one another in the circumferential direction, flexible engagement of the tooth engagement regions of the individual flexible gear wheel disks in the ring gear teeth is made possible, whereby backlash can be reduced to up to 0°.

LIST OF REFERENCE NUMERALS

1 gear mechanism
2 wave generator
3 base body
4 rolling element
5 deformable sleeve
6 flexible gear wheel
6.1 gear wheel disk
6.2 gear wheel disk
6.3 gear wheel disk
6.4 gear wheel disk
7.1 first toothed segment
7.2 second toothed segment
8 spring segments
9 ring gear
10 housing
11 pin element
12 bolt
13 sleeve
14 external gear teeth
15 internal gear teeth
17 recess
18 foot region first toothed segment
19 trunk region first toothed segment
20 head region first toothed segment
21 foot region second toothed segment
22 trunk region second toothed segment
23 head region second toothed segment
24 waisting
25 relief cut
M center axis gear mechanism
U circumferential direction
B width flexible gear
$M_{FS}$ center plane spring segment
$M_A$ center plane recess
β opening angle

The invention claimed is:
1. Gear mechanism comprising:
a ring gear, with a flexible gear wheel arranged in said ring gear, and
a wave generator which is in contact with said flexible gear wheel and which deforms said flexible gear wheel so that it is in sections in engagement in said ring gear, wherein said flexible gear wheel includes at least two flexible gear wheel disks arranged adjacent to one another in an axial direction, and each flexible gear wheel disk includes at least two toothed segments in a circumferential direction (U) which are connected to one another by spring segments.
2. Gear mechanism according to claim 1, wherein said flexible gear wheel disks located adjacent to one another in the axial direction comprise:
a same number of teeth and a same tooth geometry.

3. Gear mechanism according to claim 2, wherein said flexible gear wheel disks located adjacent to one another in the axial direction bear against one another.

4. Gear mechanism according to claim 3, wherein said flexible gear wheel disks located adjacent to one another in the axial direction have a same gear teeth width in the axial direction.

5. Gear mechanism according to claim 1, wherein said flexible gear wheel disks located adjacent to one another in the axial direction bear against one another.

6. Gear mechanism according to claim 1, wherein said flexible gear wheel disks located adjacent to one another in the axial direction have a same gear teeth width in the axial direction.

7. Gear mechanism according to claim 1, wherein said flexible gear wheel comprises:
more than two flexible gear wheel disks located adjacent to one another in the axial direction.

8. Gear mechanism according to claim 1, wherein said flexible gear wheel disks are configured as identical parts.

9. Gear mechanism according to claim 8, wherein at least one of said toothed segments of each flexible gear wheel disk comprises:
a recess, where said flexible gear wheel disks are arranged in such a way that said recesses are located one above the other and a pin element is disposed in said recesses located one above the other, and each of said spring segments of said flexible gear wheels has a center plane ($M_{FS}$) which contains a center axis (M) of said gear mechanism and divides each respective spring segment into two regions of equal length, and each recess has a center plane ($M_A$) which contains the center axis (M) of said gear mechanism and divides said recess into two equally large regions, and the center plane of each spring segment has a different distance from the center plane ($M_A$) of said recess located adjacent thereto on each side of the center plane ($M_{FS}$) of said spring segment.

10. Gear mechanism according to claim 9, wherein each flexible gear wheel disk comprises:
at least one first toothed segment which is provided with a recess, and at least one second toothed segment which has no recess.

11. Gear mechanism according to claim 9, wherein said spring segments engage in said at least one first toothed segment at a level of said recesses in said at least one first toothed segment.

12. Gear mechanism according to claim 9, wherein said recess in said first toothed segment is arranged in an interior of a respective toothed segment and has a closed contour.

13. Gear mechanism according to claim 1, wherein at least one of said toothed segments of each flexible gear wheel disk comprises:
a waisting in a radial direction of said flexible gear wheel and said spring segments engage in said toothed segment in a region of said waisting.

14. Gear mechanism according to claim 1, wherein said spring segments are configured in such a way that they exhibit elasticity in a radial direction and are rigid in a tangential direction, such that said spring segments are formed as webs which connect adjacent toothed segments to one another.

15. Gear mechanism according to claim 1, wherein each flexible gear wheel disk comprises:
a plurality of toothed segments.

16. Gear mechanism according claim 1, wherein the flexible gear wheel comprises:
four flexible gear wheel disks located adjacent to one another in the axial direction.

17. Gear mechanism according to claim 1, wherein each flexible gear wheel disk comprises:
a least four toothed segments.

18. Flexible gear wheel for a gear mechanism, the flexible gear wheel comprising:
at least two flexible gear wheel disks located adjacent to one another in an axial direction, and where each flexible gear wheel disk includes at least two toothed segments in a circumferential direction that are connected to one another by way of spring segments.

19. Flexible gear wheel according to claim 18, wherein at least one of said toothed segments of each flexible gear wheel disk comprises:
a recess for receiving a pin element, where said flexible gear wheel disks are arranged in such a way that said recesses of said flexible gear wheel disks are located one above the other and each of said spring segments has a center plane ($M_{FS}$) which contains a center axis (M) of each gear mechanism and divides each respective spring segment into two regions of equal length and each recess has a center plane ($M_A$) which contains the center axis (M) of said gear mechanism and divides said recess into two equally large regions and the center plane ($M_{FS}$) of each spring segment has a different distance from the center plane ($M_A$) of said recess located adjacent thereto on each side of the center plane ($M_{FS}$) of said spring segment.

20. Flexible gear wheel according to claim 18, comprising:
four flexible gear wheel disks located adjacent to one another in the axial direction, and where each flexible gear wheel disk includes at least two toothed segments in the circumferential direction that are connected to one another by way of spring segments.

* * * * *